United States Patent [19]

Vinas

[11] 4,080,125
[45] Mar. 21, 1978

[54] DEVICE FOR THE STEPLESS MANUFACTURE OF EXPANDED CELLULAR MATERIAL BLOCKS WITH A CIRCULAR CROSS-SECTION

[75] Inventor: Severiano Palomares Vinas, Madrid, Spain

[73] Assignee: Policastilla, S.A., Spain

[21] Appl. No.: 766,619

[22] Filed: Feb. 7, 1977

Related U.S. Application Data

[63] Continuation of Ser. No. 628,504, Nov. 3, 1975, abandoned.

[30] Foreign Application Priority Data

Sep. 16, 1975 Spain .................................... 215.156

[51] Int. Cl.² .................... B29D 27/00; B29G 7/02
[52] U.S. Cl. ......................... 425/4 C; 425/89; 425/224; 425/364 R
[58] Field of Search ................ 425/89, 4 C, 223, 224, 425/DIG. 54, 363, 364 R, 371

[56] References Cited

U.S. PATENT DOCUMENTS

| | | |
|---|---|---|
| 2,886,849 | 5/1959 | Brierley ........................ 425/89 |
| 3,325,573 | 6/1967 | Boon et al. ................. 425/175 X |
| 3,496,596 | 2/1970 | Buff ............................. 425/4 C |
| 3,672,348 | 6/1972 | Ferstenberg ................. 425/364 |
| 3,751,197 | 8/1973 | Petzetaris .................... 425/4 C |
| 3,761,209 | 9/1973 | Hanton ........................ 425/4 C |

Primary Examiner—Richard B. Lazarus
Attorney, Agent, or Firm—Bucknam and Archer

[57] ABSTRACT

An apparatus for the manufacture of blocks of expanded cellular material having an essentially circular cross section from foamable means which comprises a stationary generally U-shaped mold having two sides, a bottom and an open top and forming an elongated channel cavity having a circular cross section, conveyor means fitting into said channel cavity and having a downward inclination, means pouring the foamable mass onto the conveyor means at the upper end thereof, means for moving said conveyor means away from said pouring means, means for heating the conveyor means to the same temperature as the mold, a substantial portion of said conveyor means going through said mold, means for fitting the conveyor means within the mold whereby said foamable mass acquires the circular shape of the inner portion of the mold as it moves away from said pouring means and as it solidifies.

7 Claims, 4 Drawing Figures

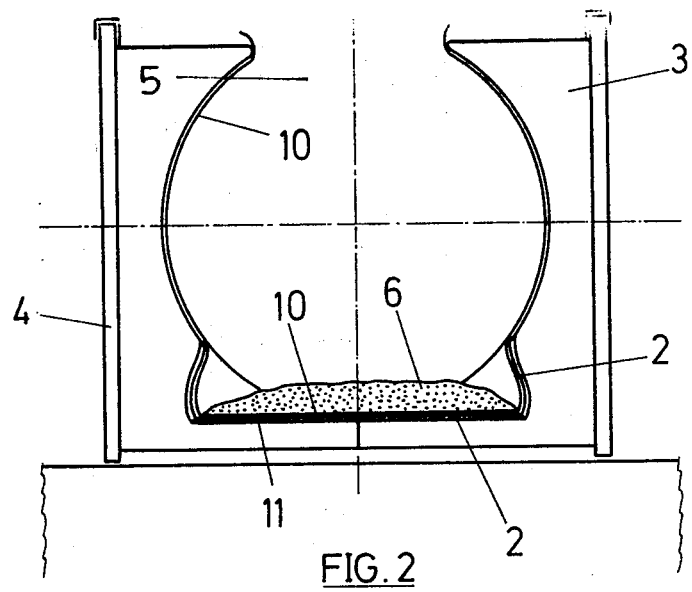
FIG. 2
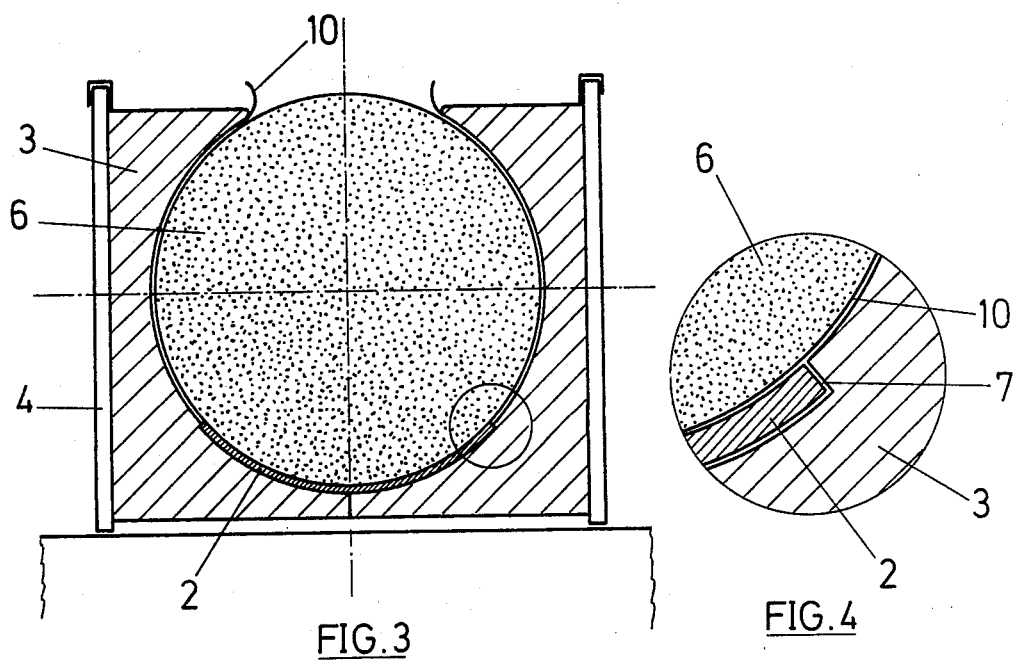
FIG. 3
FIG. 4

DEVICE FOR THE STEPLESS MANUFACTURE OF EXPANDED CELLULAR MATERIAL BLOCKS WITH A CIRCULAR CROSS-SECTION

This is a continuation, of application Ser. No. 628,504, filed Nov. 3, 1975, and now abandoned.

The object of the present invention concerns a device for the stepless manufacture of expanded cellular material blocks with a circular cross-section, which offers essential new features over what is currently known.

The object of the invention refers to the stepless obtainment of an expanded cellular product, mainly of polyurethane foam, although any cellular product with similar features can be used, obtaining a block with a circular cross-section.

In the industry devoted to obtaining continuous blocks of polyurethane foam, and mainly, in that of circular cross-section blocks, which then have to be cut in thin sheets to make reels, one basic problem arises, which is that of obtaining as perfect a block as possible, to reduce waste material to the minimum. By the conventional system, blocks are obtained whose cross section has the bottom and sides perpendicular to each other and the upper part curved. As it can easily be understood, this system wastes a large amount of material.

On the other hand, as the foaming process is an exothermic reaction, the foam being formed and in continual contact with the forming sides of the mould heats the latter greatly, unlike the conveyor belt, which acquires a lower temperature, as it is not constantly in contact with the foam. This difference in temperature produces different densification in the block surface, a larger and harder crust being obtained in the lower part, corresponding to the area in contact with the conveyor belt, than in the sides. As this crust has to be separated from the block, before cutting in into sheets, being waste material, the loss of material and weight is greater with the production of the denser lower part.

In order to overcome the disadvantages of the conventional system, different studies have been carried out, from which two systems have been obtained for achieving continuous approximately circular cross-section blocks. One system makes both the sides and bottom of the mould moveable, and the other places some fixed shapes in the side to shape the foam and leave the bottom in contact with the bottom of the moveable belt to drag the foam. In both cases, a block with a slightly more circular cross section is obtained than in the conventional system, but with the lower part flat, i.e. wasting material.

On the other hand, none of the two systems outlined reduce the outer crust or the difference in densities.

With the system claimed by the invention, these disadvantages are overcome, and the following advantages obtained:

a. It obtains a perfectly circular block, compared with those obtained by the methods known until now, with the respective saving in waste material, thereby obtaining relevant economic advantages.

b. It reduces to the minimum loss of material produced by the skin forming on obtaining a crust with even density and thinner.

c. Compared with the system of moveable forming sides, it offers the advantage of being able to be installed in a conventional production machine within a short time, so the machine can still produce non-circular blocks.

d. Compared with the system of shapers fixed to the sides, it has a larger drag surface, obtaining greater synchronism between the foam motion and the conveyor.

All these advantages are obtained by the system being made up of some fixed shapers backed onto the channel of the conventional machine, which form a perfectly circular cross section with the exception of a portion in its upper part which can be left open to allow the gases to escape freely and allow the foam to expand.

To enable the drag of the foam, a thin pliable conveyor belt has been provided which is adapted to the circular shaper; a covering material, such as paper, is placed on this belt, which prevents the foam sticking to the belt, when the said foam is still plastic. This belt is fitted to the shaper in a slot made in it.

Movement of the conveyor belt is achieved through friction rollers, aided by other guide and tension rollers.

To ensure that the distribution of the liquid poured from the discharge regulator is suitable in the pouring area, the conveyor belt shall have an initially flat course before reaching the shaper, where its pliability enables it to adapt itself to the circular shape thereof and helps the spreading of the product.

To understand the nature of the invention better in the attached drawing, we make a schematical representation of its use, not being atall limitative and therefore liable to whatever accessory modifications which do not alter its essential features FIG. 1 is a side view of the system, cross-sectioned lengthwise.

FIG. 2 is a detailed cross section, I—I.

FIG. 3 shows a detailed cross section, II—II.

FIG. 4 shows the recess or slot in the shapers.

Figure 1:
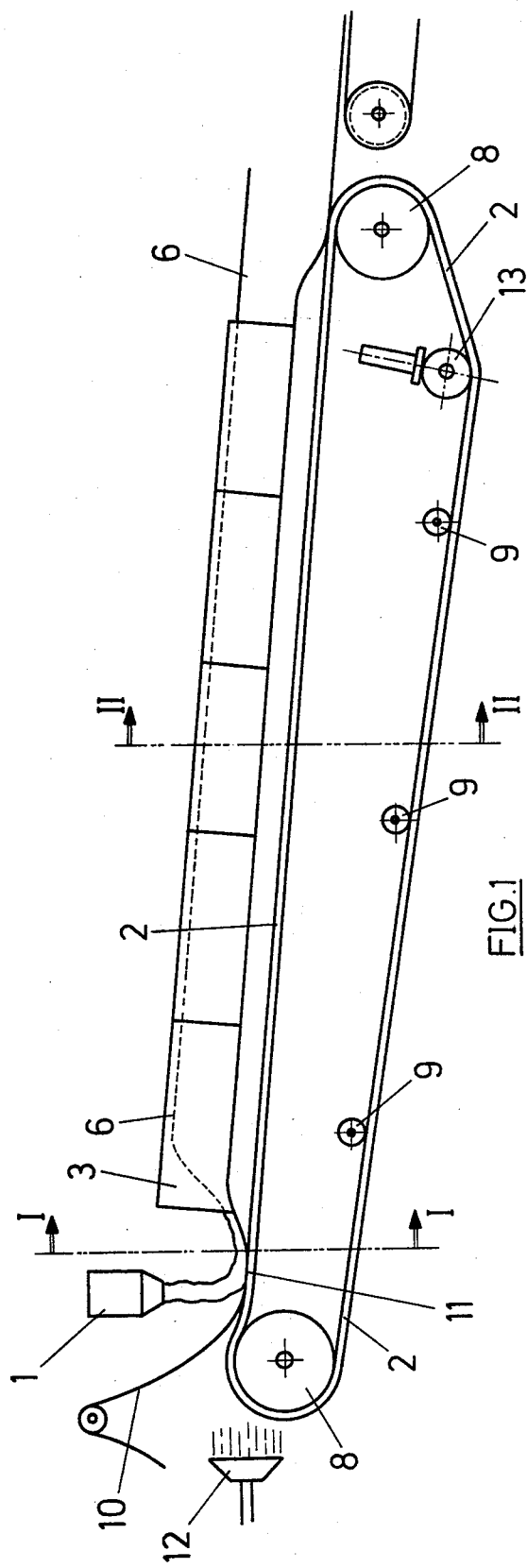

The new method is based on obtaining a block of expanded cellular product, with a completely circular cross-section, thereby reducing losses through waste material to the minimum.

The method starts from pouring the liquid product by means of the discharge regulator 1, falling onto the conveyor belt 2, which will drag the foam 6, being formed, through the mould, which will give it the desired shape, in this case, circular.

The mould is made up of the shapers 3, which can be stepless or made up of components, as seen in FIG. 1. Outside, the shapers will be rectangular in shape, suitable for fitting to the channel 4 of a conventional machine, its inside being circular, as seen in FIGS. 2, 3 and 4, its upper part 5 being open, to allow the gases to escape and the foam to expand.

In their lower inside part, the shapers 3 will have a recess or slot 7, so that the conveyor belt 2 can be fitted into it, being on the same level as the mould surface 3.

The conveyor belt 2 is dragged through the drive rollers 8 and is guided by the rollers 9. Likewise, and to keep the said belt 2 always taut, a tension roller 13 is fitted. The rollers 8 drag the belt by friction.

Furthermore, and to avoid the foam 6, which is still in a pastey state, soiling the belt 2, and the shapers 3, it is envisaged to interlay between said foam 6 and the latter, the covering material or cover band 10 which can be made of paper. This cover band 10 has to have perfect synchronism, in movement, with the foam 6.

When the foam 6 is poured, the material has to be perfectly distributed, mainly towards the sides. To achieve this, the device sees that before the conveyor belt 2 goes into the moulds 3, it slides a certain distance 11 in a flat area, which means that the material spreads better.

In order to reduce to the minimum the crust which forms in the blocks and taking into account that the foaming reaction is exothermic, the device has a heater built into the conveyor belt 2, through the emitter 12, thereby making the temperature of said belt the same as that of the shapers 3, and thus obtaining an even temperature, which will mean that the crust formed in the block 6 is very thin and with homogeneous proportioning, ensuring minimum waste.

When the foaming process starts, the discharge regulator 1 pours the liquid on the cover material 10, synchronized in movement with the conveyor belt 2, which drags the material, first along the flat area 11 to spread it out well. Subsequently the belt 2 starts to go into the moulds 3, as shown in FIG. 2, whereby the belt 2, the cover 10 and the material 6 all start to take the circular shape of the said mould 3 until the moment of maximum expansion arrives; the foam 6 has acquired a perfectly circular cross section, as seen in FIG. 3.

In the gap 5, opened in the moulds 3, the very expansion of the foam 6 provides the necessary curve for the continuity of the circumference of these moulds 3.

As already mentioned hereinabove, the shapers 3 can be in a single part, as the conveyor belt 2 is dragged by means of the friction rollers 8.

With this new device, a continuous foam block can be produced, with a completely circular cross section, in conventional plants, by merely building into the foaming channel 4, the mould 3; this channel can be either continuous or made up of modular shapers.

I claim:

1. An apparatus for the manufacture of blocks of expanded cellular material having an essentially circular cross section from foamable means which comprises, a stationary generally U-shaped mold having two sides, a bottom and an open top and forming an elongated channel cavity having a circular cross-section, conveyor means fitting into said channel cavity and having a downward inclination, means pouring the foamable mass onto the conveyor means at the upper end thereof, means for moving said conveyor means away from said pouring means, means for heating the conveyor means to the same temperature as the mold, a substantial portion of said conveyor means going through said mold, means for fitting the conveyor means within the mold whereby said foamable mass acquires the circular shape of the inner portion of the mold as it moves away from said pouring means and as it solidifies.

2. The apparatus according to claim 1 wherein the conveyor means is a conveyor belt which travels on a flat surface prior to going through said mold.

3. The apparatus according to claim 1 which is provided with a band between said conveyor means and said foamable mass and means for synchronizing the motion of said band with the motion of said conveyor means.

4. The apparatus according to claim 3 wherein said band is made of paper.

5. The apparatus according to claim 1 wherein said mold is made up of modular portions.

6. The apparatus according to claim 1 wherein said means for fitting the conveyor means within the mold comprise a recess in said mold, said recess being on the same level as said hollowed inner circular portion of the mold.

7. The apparatus according to claim 1 wherein said mold is made of shapers having an outer rectangular shape.

* * * * *